United States Patent Office 3,285,110
Patented Nov. 15, 1966

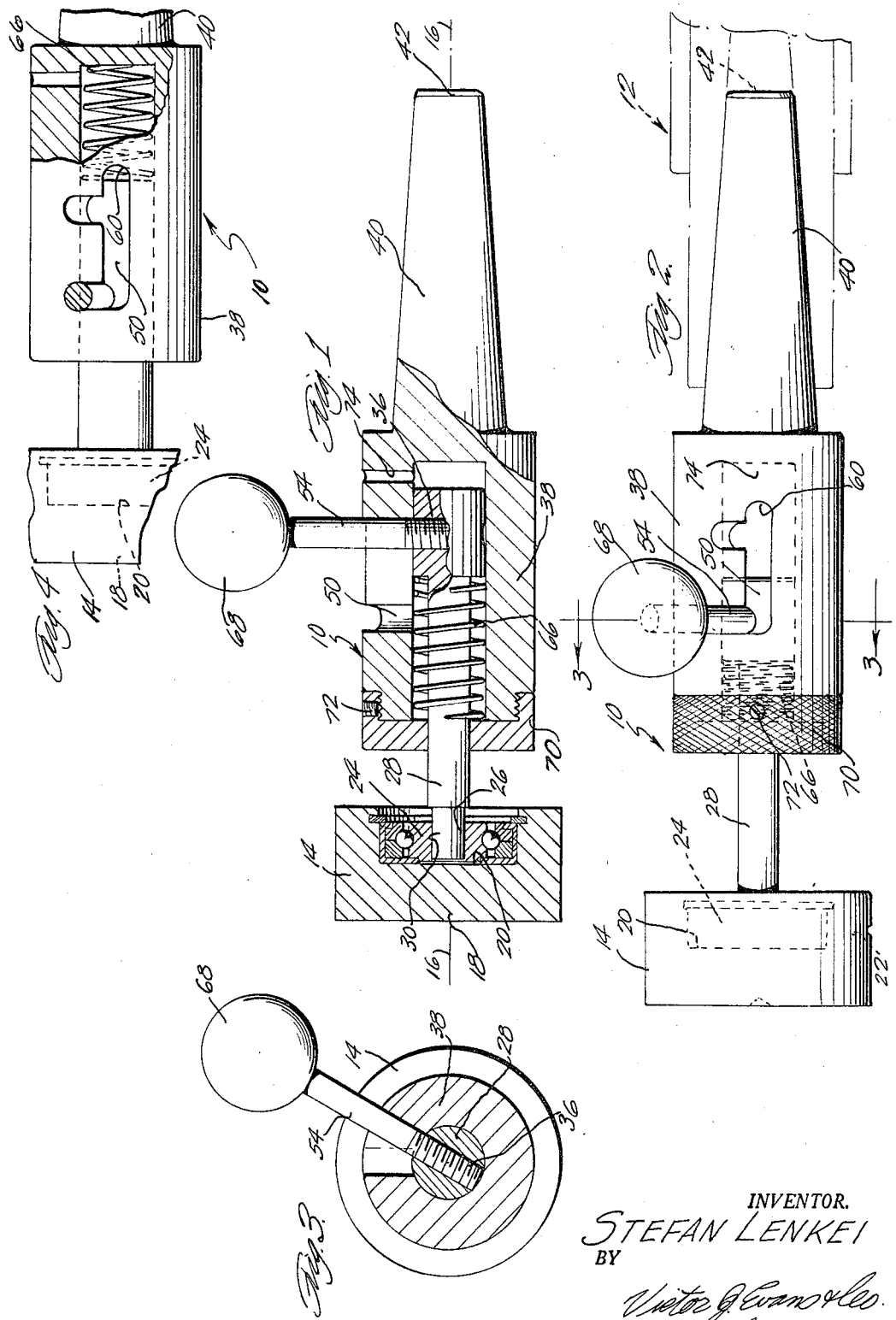

3,285,110
ENGINE LATHE LENGTH STOP
Stefan Lenkei, 472 Cliff Road, Sewaren, N.J.
Filed Sept. 22, 1965, Ser. No. 489,346
3 Claims. (Cl. 82—34)

The present invention relates to an engine lathe length stop for working from the tail stock in the adjustment for the right length so that it will become unnecessary to put the workpiece back to face it off, and more particularly the present invention relates to an improved length stop that precludes any intermediate step for facing off a workpiece or material, and so that a lathe may be adapted to hold any length of material within plus or minus .001 inch.

More particularly, the procedure found best adapted for use of the present invention, wherein the present invention provides the time-saving steps over the prior art, is to put the material or workpiece into the machine or lathe, face off the rough surface from the material with an already set-up cut-off tool bit, leave the tool bit there in the center and set an adjustable parallel for the length desired to cut off, put the length stop in the tail stock, pull it off as close as necessary and then tighten the tail stock, place the adjustable parallel in between the tool bit and the length stop head, and when the length stop head and the adjustable parallel are in contact, the adjustable parallel is removed, the tool bit is pulled back, and the three-jaw chuck is open so that the material is pulled out until the end of the length stop head is contacted, and then one tightens the chuck and is ready to cut off the first piece.

An object and advantage of the present invention is that once one has cut off the material for the right length, it is unnecessary to put it back again for facing it off, and thus here a tremendous amount of time and motion has been saved. The device of the present invention will hold any length within ±.001 inch.

A further object of the present invention is to provide a device that is inexpensive and readily maneuverable for use, and for particular use in small machine shops which have not available any turret lathes.

The above and other objects and advantages of the invention will become apparent upon full consideration of the following detailed description and accompanying drawings, in which:

FIGURE 1 is a front elevational view shown partially in cross-section of the improved engine lathe length stop member in accordance with a preferred embodiment of the present invention;

FIGURE 2 shows a top elevational view of the embodiment shown in FIGURE 1 in which the lathe length is shown in the open position;

FIGURE 3 is a cross-sectional view taken along line 3—3 of FIGURE 2, and

FIGURE 4 is a broken away view of a modification of the invention.

Referring now to the drawings, there is shown a lathe length stop member 10 according to the present invention and shown in cooperation with a portion of a lathe 12 (shown in dotted line) and in which the engine lathe length stop includes a stop head 14 having an axis 16, 16 through the center thereof as well as through the center of the engine lathe length stop member 10 and in which there is a mounting recess 18 on one side of the stop head and on which there is a more substantial recess 20 on the other side thereof which is also in alignment generally with the axis 16, 16. A radially disposed recess 22 is provided in the stop head 14 for allowing grease to be received within the substantial recess 20. This is for the purpose of allowing a ball bearing assembly 24 to be lubricated properly and effectively by the ingress of grease or other suitable lubricant therein. The ball bearing 24 is mounted within the substantial recess 20 from the outer diameter of the ball bearing and the inner diameter or opening 26 of the ball bearing member 24 is provided to receive a shaft 28 of generally uniform diameter throughout, but having a section at one end thereof provided with a reduced diameter 30. The reduced diameter 30 of the shaft 28 is substantially common to the inner diameter of the ball bearing and is adapted to fit therein.

A threaded aperture 36 of uniform diameter and diametrically extending through the shaft 28 is disposed at the intermediate or other end portion of the shaft 28 from the reduced diameter portion, and a hollow housing 38 open at one end is adapted to receive the shaft 28, while the closed end of the housing 38 is integral with a tapered shank 40 and which is made integral to have its axis in alignment with the axis 16, 16. The distal end of the shank has a mounting recess 42 which is in alignment with said axis.

The housing 38 has a U-shaped peripheral aperture 50, and particularly shown in FIGURE 2, which communicates with the hollow inside of the housing 38 and the U-shaped aperature further includes a tail or extension of the base of the U-shaped aperture to form generally a V-shape.

As is further illustrated and demonstrated in the drawings and operation thereof, there is an arm 54 that is provided in threaded engagement with the threaded aperture 36 and it extends throughout a portion of its length within the U-shaped aperture. The U-shaped aperture provides two positions for the shaft or arm 54 to be located, and it is seen by the means of the extension 60 that all of the available and possible features of adjustment and length stop are achieved.

A spring 66 is provided in its extended position as shown in FIGURE 1, and in its compressed position by the illustration of FIGURE 2, when the arm 54 is in the left slot of the U-shaped aperture. A knob 68 may be provided on the arm 54 as shown. The housing 38 is closed off by an end member 70 having a knurled surface as illustrated in the drawing, and in which the inner surface of the end member 70 provides a retaining portion for the spring 66. The end member 70 for the housing 38 is threadedly engaged thereon, and a set screw 72 is provided for seeing that the end member 70 is securely in place and immovable therefrom. A further lubricating aperture 74 is provided in the housing 38.

The procedure in putting the material into the engine lathe, is to first face off the rough surface of an already set-up cut-off tail tool bit. Then leave the tool bit right there in the center and set up an adjustable parallel for the right length which is necessary to cut off, and then tighten the tail stock. The length stop handle or knob 68 is then moved forward and then the adjustable parallel is put in between the tool bit and the stop head. The adjustable parallel used herein is then removed and the handle is pulled back on the length stop 14. The right length is now provided and the workpiece is ready to cut. After the first step, the work material may be pulled on the stop head and it may be worked forward and reverse. With this setup, one is able to hold the length within ±.001 inch.

Additional embodiments of the invention in this specification will or may occur to others and therefore it is intended that the scope of the invention be limited only by the the appended claims and not by the embodiment, described hereinabove. Accordingly reference should be made to the following claims in determing the full scope of the invention.

What is claimed is:
1. An engine lathe length stop comprising a stop head having an axis through its center, a mounting recess on one end and in alignment with the axis, and a substantial recess on the other end thereof also in alignment with the axis, a radially disposed recess in the stop head for providing grease to the recess from the periphery thereof, a ball bearing mounted in the recess from its outer diameter and having an inner diameter defining an opening, a shaft of generally uniform diameter but having a section at one end thereof of reduced diameter substantially common to the inner diameter of the ball bearing, and adapted to fit therein, a threaded aperture of uniform diameter and diametrically extending through the shaft, a hollow housing open at one end and closed at the other by a tapered shank and having a longitudinal axis throughout, the distal end of the shank having a mounting recess in alignment with said axis, said housing having a U-shaped aperture communicating with the hollow inside of the housing and including further an extension of the base of the U-shaped aperture to form generally a U-shape, an arm threadedly engaging the threaded aperture of the shaft and extending through the U-shaped aperture, and a spring for biasing the shaft from the housing when it is disposed therein.

2. The invention according to claim 1, wherein said U-shaped aperture provides for holding the length in an engine lathe to a minimum, within the range of ±0.001.

3. The invention according to claim 1, wherein a knurled cap is provided to close off the hollow housing and also to retain said spring therein.

No references cited.

WILLIAM W. DYER, Jr., *Primary Examiner.*

L. VLACHOS, *Assistant Examiner.*